Oct. 24, 1950  P. S. WILLIAMS  2,527,170
METHOD AND APPARATUS FOR DETECTING CORROSION
Filed April 5, 1947  2 Sheets-Sheet 2

Philip S. Williams Inventor
By P. J. Whelan Attorney

Patented Oct. 24, 1950

2,527,170

UNITED STATES PATENT OFFICE 2,527,170

METHOD AND APPARATUS FOR DETECTING CORROSION

Philip S. Williams, Tulsa, Okla., assignor to Standard Oil Development Company, a corporation of Delaware Application April 5, 1947, Serial No. 739,547

1 Claim. (Cl. 175—183)

The present invention is directed to a method and apparatus for detecting corrosion in pipes. More particularly, it is directed to such a method and apparatus peculiarly adapted for detecting corrosion in pipes which are sunk in the earth.

The principal object of the present invention is the provision of a method and apparatus by the employment of which it is possible to detect defects in pipe due to corrosion or other causes which are otherwise not readily detectable.

Another object of the present invention is the provision of a method and apparatus of the type indicated by the employment of which it is possible to produce a log of a borehole casing, or other pipe situated in a borehole, revealing the location of any pits or holes or other defects in the buried pipe.

A more specific object of the present invention is the provision of a method and apparatus of the type indicated characterized by the fact that the magnetic properties of a pipe are measured in such a manner that deformities in the pipe of the character of pits and holes produce a readily distinguishable signal on a record.

An additional object of the present invention is the provision of an apparatus which may be lowered through a buried casing or pipe and which contains a magnetic scanner capable of producing an electrical signal and which also includes connections with the surface whereby said electrical signal may be recorded at the surface.

Other objects and advantages of the present invention will appear from the following detailed description and the accompanying drawings, in which;

Fig. 4 is a plan view of a record strip of the type obtainable by logging a casing according to the present invention.

Figure 1:
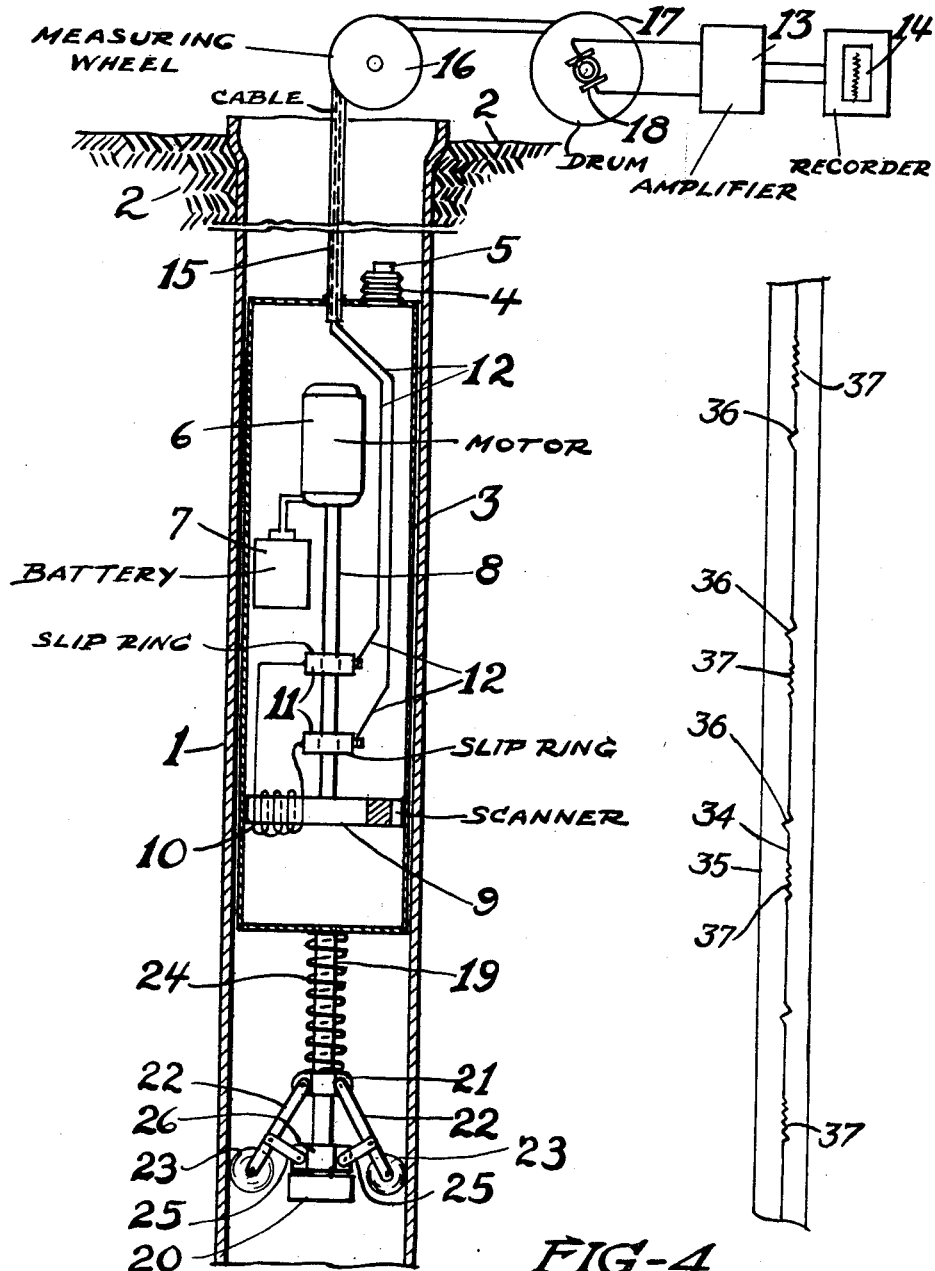
Fig. 1 is a front elevation partly in section of one embodiment of the present invention shown in position in a borehole.

Referring to Fig. 1 in detail, numeral 1 designates a casing in a borehole, the surface of the ground being indicated by numeral 2. Arranged inside the casing is a cartridge or bomb 3 which is preferably constructed of a thin-walled, non-magnetic material. The bomb is provided with a bellows type spout 4 having a stoppered opening 5 for filling the bomb with a liquid such as kerosene. The purpose of the bellows type spout is to compensate for the pressure differential between the inside and outside of the bomb whereby the walls need not have sufficient mechanical strength to withstand the borehole pressure.

Suitably mounted in the bomb is an electric motor 6 driven by batteries 7. The shaft 8 of the motor carries at its free end a magnetic scanner 9 on which is wound a coil 10 the ends of which are connected to slip rings 11 mounted on the shaft 8. The slip rings are connected by conductors 12 to a recording apparatus at the surface, including an amplifier 13 and a recorder 14 which may be either of the pen type or the galvanometer type. It will be understood that the conductors 12 are arranged inside a cable 15 from which the bomb is suspended. This cable at the surface is threaded over a measuring wheel 16 and is wound on a drum 17. The conductors are connected to the shaft of the drum in the usual manner and a slip ring arrangement is provided for connecting the conductors to the amplifier 13. All this surface equipment is customary in various types of well logging operations and is, therefore, not discussed in greater detail. Such equipment usually includes means for synchronizing the movement of the record strip with the movement of the borehole bomb.

Extending from the bottom of the bomb is a rod 19 having a stop 20 at its lower end. A collar 21 carrying three or more pivoted arms 22 is slidingly arranged on the rod 19. At the outer end of each rod is a roller 23 which is spring pressed against the casing by a spring 24. Links 25 are pivoted to the arms 22 and to a lower collar 26. This assembly of elements constitutes a self-adjusting centering device. A similar arrangement (not shown) is provided at the top of the bomb.

Figure 2:
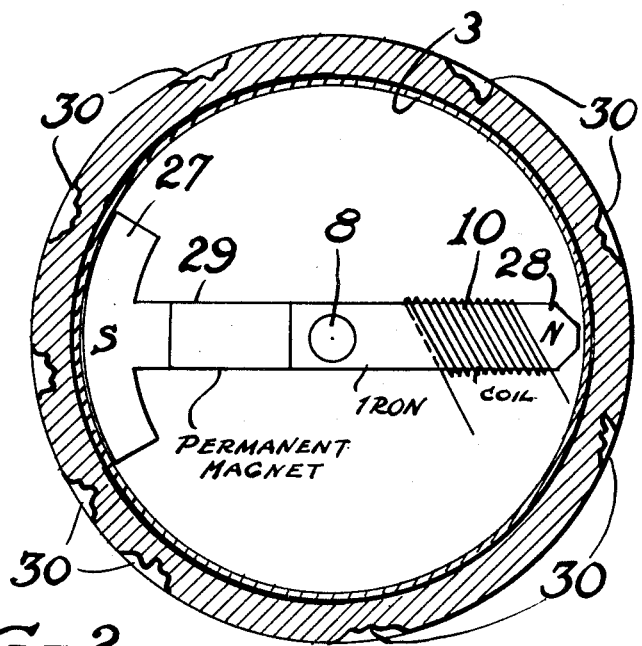
Fig. 2 is a plan view of one type of magnetic scanner according to the present invention.

Referring to Fig. 2, the bomb casing is omitted in order that the principle involved may be better illustrated. The shaft 8 of the motor carries a T-shaped member, the cross portion 27 of which is arcuate in shape to conform to the shape of the interior of the casing. This cross member is composed of soft iron or other magnetic material and constitutes the south pole of a magnet. The free end 28 of the leg of the T is also composed of soft iron or other magnetic material. This free end constitutes the north pole of the magnet and terminates a short distance away from the casing. This means, of course, that the whole T-shaped member fits snugly in the bomb 3 which in turn is of a cross-sectional area closely approximately that of the interior of the casing whereby the distance between the poles of the magnet and the casing to be studied is little more than the wall thickness of the bomb.

Between the two pieces of soft iron there is interposed a strong permanent magnet 29. A suitable material for use in this magnet is "Alnico 5". A coil 10 is wound around the north pole of the assembly in the manner shown.

As the bomb is lowered in the borehole the scanner is continuously rotated. This scanner sets up a magnetic field which includes the casing. The coil 10 is in this magnetic field. Where the casing is deformed as by pits 30 resulting from corrosion, the magnetic field is modified. The changing of the intensity of the magnetic field due to such deformities sets up an induced E. M. F. in the coil 10 which is transmitted to the surface and there amplified and recorded. If the casing is sound the record will be substantially a straight line. Any change in the magnetic field, however, due to deformities as heretofore indicated, will produce peaks or humps on the record.

It may be observed that it is desirable to maintain the impedance of the coil 10 fairly low for reasons connected with pick-up of electrical noise in the cable leading to the surface. On the other hand, because of cable resistance, the coil impedance cannot be too low. The actual make-up of the coil, therefore, must be a compromise, but is not too limited. A coil having 200 turns of fairly thick copper wire giving a resistance of 60 ohms for the total coil has been found satisfactory. It will be apparent, however, that the actual specifications of the coil can be varied depending on various factors.

In operating the device the rate of travel of the bomb along the borehole can be regulated in accordance with the detail desired. A convenient procedure is to lower the bomb through the casing rather rapidly, say at a rate of about 50 ft./min. This will produce a record on which sections of the casing containing deformities will be indicated, but in which little detail of the degree of deformity or its exact location will be given. The bomb can then be moved upwardly rapidly past those sections of casing which appear to be uniform, and slowly, say at a rate of about 10 ft./min., past those sections which were indicated on the down trip to require more detailed investigation.

The rate at which the scanning device is rotated can also be varied somewhat. It will be appreciated that since the signal is produced by the rate of change of the magnetic field the higher the rate of rotation the more rapid will be this rate of change and, therefore, the larger the signal. A rotation rate of 100 R. P. M. has been found to be satisfactory.

Figure 3:
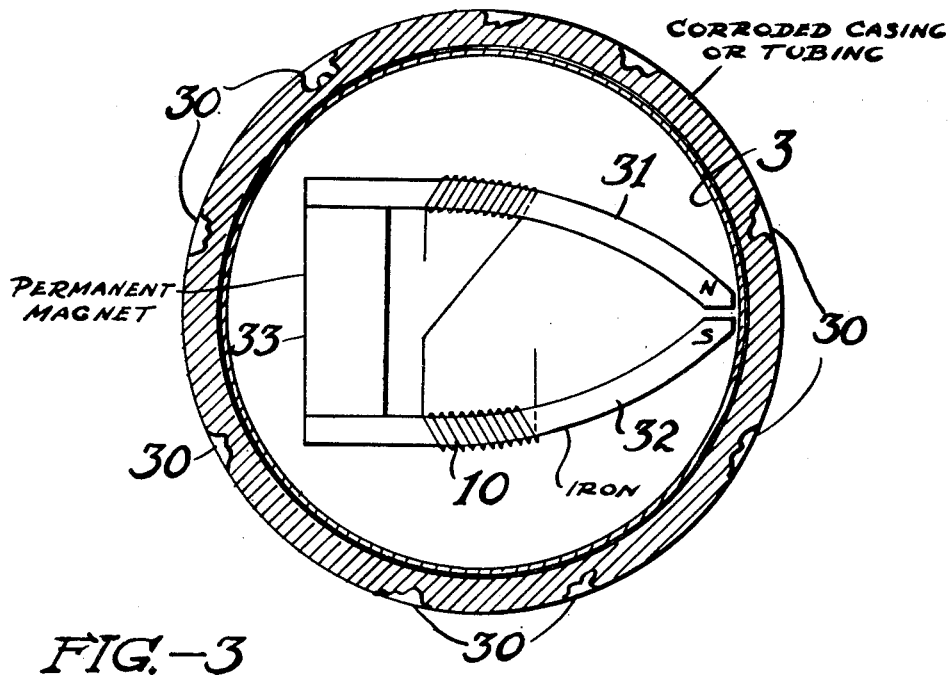
Fig. 3 is a plan view of a modified type of magnetic scanner according to the present invention.

The modification shown in Fig. 3 differs from that shown in Fig. 2 in an important respect. It will be observed that in the modification shown in Fig. 2, the lines of force travel around the entire periphery of the casing. In the modification shown in Fig. 3 the field of force is confined to the area adjacent to the north and south poles of the magnet which are disposed close to each other. This means that the deformity in the casing which comes within this field of force will have a greater effect thereon than will the same deformity in the modification shown in Fig. 2.

In Fig. 3 curved arms 31 and 32 are composed of soft iron or other magnetic material. The rear ends of these arms are secured to a permanent magnet 33 of the character heretofore indicated. The coil 10 in this case is wound on both arms in the manner shown. The free ends of the arms are spaced apart any desired distance depending upon the size of the deformities to be detected. This distance may vary from about ¼" to 2 or 3" or more, if desired.

In Fig. 4 is shown the type of record which may be expected in the logging of a casing. This record is in the form of a trace 34 on a strip of paper 35. The large kicks 36 on this record indicate the casing joints. The small kicks 37 indicate deformities which in the ordinary case will be pits resulting from corrosion either on the inside or outside of the casing. This type of record is produced with a fairly high rate of travel of the scanner along the casing with the result that the deformities do not show up in any considerable detail. This record would indicate that the particular sections showing the kicks 37 should be studied more carefully with a slower rate of travel of the bomb. The presence of the kicks 36 on the record is very helpful since it enables the observer to determine more accurately the depth at which deformities are indicated.

It is to be understood that the existence of magnetic lines of force in the earth is taken into account in the design of the present invention. It is by reason of the possible existence of such lines and their possible magnetization of portions of a casing that a strong magnet composed of material such as "Alnico 5" is used. Such a magnet sets up a magnetic field sufficiently strong so that the existence of any natural magnetic lines of force will constitute so slight a percentage of the total magnetic field as to have no noticeable effect on it.

The specific embodiment of the present invention described herein relates to the use of the scanner in the examination of well casing. It will be understood that a properly proportioned scanner can also be employed for the study of well tubing. Likewise the apparatus can be readily adapted for use in surface pipe lines. In this case where the exterior of the pipe line is exposed and can be readily examined, a similar device may be moved along the exterior for detecting flaws or deformities on the inner surface of the pipe.

The nature and objects of the present invention having been thus described and illustrated, what is claimed as useful and is desired to be secured by Letters Patent is:

An apparatus for detecting deformities in a pipe comprising a scanning device adapted to be moved along the inside of the pipe, said scanning device comprising a pair of curved arms of magnetic material lying in a plane perpendicular to the longitudinal axis of said pipe, a strong permanent magnet placed between and secured to one end of each of said arms, the free ends of the arms being curved in toward each other in said plane so as to terminate in close spaced relation to each other, a coil wound about at least one of said arms, means for rotating said scanning device about the longitudinal axis of said pipe in said plane, means for maintaining the termini of said free ends of said arms in close spaced relation to the wall of said pipe, and means for detecting voltages generated in said coil.

PHILIP S. WILLIAMS.

REFERENCES CITED

The following references are of record in the file of this patent:

UNITED STATES PATENTS

| Number | Name | Date |
| --- | --- | --- |
| 2,179,240 | Breitenstein | Nov. 7, 1939 |
| 2,207,592 | Lenk | July 9, 1940 |
| 2,255,053 | Gunn | Sept. 9, 1941 |
| 2,259,904 | McNamee et al. | Oct. 21, 1941 |
| 2,308,159 | Drummond et al. | Jan. 12, 1943 |
| 2,359,894 | Brown et al. | Oct. 10, 1944 |